United States Patent
Bae et al.

(10) Patent No.: US 11,139,532 B2
(45) Date of Patent: Oct. 5, 2021

(54) SECONDARY BATTERY AND METHOD FOR INTERRUPTING CURRENT OF SECONDARY BATTERY

(71) Applicant: LG Chem, Ltd., Seoul (KR)

(72) Inventors: Young San Bae, Daejeon (KR); Duk Hyun Ryu, Daejeon (KR); Kwan Soo Lee, Daejeon (KR)

(73) Assignee: LG Chem, Ltd.

( * ) Notice: Subject to any disclaimer, the term of this patent is extended or adjusted under 35 U.S.C. 154(b) by 514 days.

(21) Appl. No.: 15/757,844

(22) PCT Filed: Jun. 8, 2017

(86) PCT No.: PCT/KR2017/005970
§ 371 (c)(1),
(2) Date: Mar. 6, 2018

(87) PCT Pub. No.: WO2017/222215
PCT Pub. Date: Dec. 28, 2017

(65) Prior Publication Data
US 2020/0144574 A1    May 7, 2020

(30) Foreign Application Priority Data
Jun. 22, 2016 (KR) .......................... 10-2016-0077867

(51) Int. Cl.
*H01M 50/317* (2021.01)
*H01M 50/581* (2021.01)
(Continued)

(52) U.S. Cl.
CPC ......... *H01M 50/317* (2021.01); *H01M 4/661* (2013.01); *H01M 50/147* (2021.01);
(Continued)

(58) Field of Classification Search
None
See application file for complete search history.

(56) References Cited

U.S. PATENT DOCUMENTS

| | | | |
|---|---|---|---|
| 5,766,793 A | 6/1998 | Kameishi et al. | |
| 5,879,832 A | 3/1999 | Vu et al. | |

(Continued)

FOREIGN PATENT DOCUMENTS

| | | |
|---|---|---|
| CN | 100424915 C | 10/2008 |
| CN | 102473890 A | 5/2012 |

(Continued)

OTHER PUBLICATIONS

Extended European Search Report including Written Opinion for Application No. EP17815628.7 dated May 11, 2018.

(Continued)

*Primary Examiner* — Brian R Ohara
(74) *Attorney, Agent, or Firm* — Lerner, David, Littenberg, Krumholz & Mentlik, LLP (57) ABSTRACT

A secondary battery and a method for interrupting current of the secondary battery according to the present invention includes a bimetal applied to the secondary battery. Thus, when an internal temperature of the secondary battery reaches a predetermined temperature, current may be interrupted even before an internal pressure of the secondary battery reaches a predetermined pressure to effectively interrupt the current in case of emergency, thereby preventing the secondary battery from being exploded or fired.

12 Claims, 5 Drawing Sheets

(51) Int. Cl.
*H01M 50/578* (2021.01)
*H01M 50/147* (2021.01)
*H01M 4/66* (2006.01)

(52) U.S. Cl.
CPC ....... *H01M 50/578* (2021.01); *H01M 50/581* (2021.01); *H01M 2200/101* (2013.01)

(56) References Cited

U.S. PATENT DOCUMENTS

| | | | |
|---|---|---|---|
| 6,342,826 | B1 | 1/2002 | Quinn et al. |
| 6,620,544 | B1 | 9/2003 | Shin et al. |
| 7,601,455 | B2 | 10/2009 | Yoon |
| 8,876,917 | B2 | 11/2014 | Nakagawa et al. |
| 2006/0097701 | A1* | 5/2006 | Kodama ............. H01M 10/443 320/147 |
| 2006/0121336 | A1 | 6/2006 | Yoon |
| 2009/0317707 | A1* | 12/2009 | Cha ........................ H01M 2/22 429/163 |
| 2012/0121968 | A1 | 5/2012 | Nakagawa et al. |

FOREIGN PATENT DOCUMENTS

| | | |
|---|---|---|
| JP | 200184880 A | 3/2001 |
| JP | 2001519085 A | 10/2001 |
| JP | 2004235044 A | 8/2004 |
| JP | 2004273139 A | 9/2004 |
| JP | 2006147564 A | 6/2006 |
| JP | 4213846 B2 | 1/2009 |
| JP | 201369611 A | 4/2013 |
| KR | 19970024353 A | 5/1997 |
| KR | 100778977 B1 | 11/2007 |
| KR | 20120022994 A | 3/2012 |
| KR | 20130008330 A | 1/2013 |
| KR | 20160034794 A | 3/2016 |
| WO | 2004068625 A1 | 8/2004 |

OTHER PUBLICATIONS

Search report from International Application No. PCT/KR2017/005970, dated Sep. 13, 2017.

Chinese Search Report for Application No. CN201780003183.4 dated Mar. 19, 2020.

* cited by examiner

SECONDARY BATTERY AND METHOD FOR INTERRUPTING CURRENT OF SECONDARY BATTERY

CROSS-REFERENCE TO RELATED APPLICATION

The present application is a national phase entry under 35 U.S.C. § 371 of International Application No. PCT/KR2017/005970, filed Jun. 8, 2017, published in Korean, which claims the benefit of the priority of Korean Patent Application No. 10-2016-0077867, filed on Jun. 22, 2016, the disclosures of which are hereby incorporated herein by reference in their entireties.

The present application claims the benefit of the priority of Korean Patent Application No. 10-2016-0077867, filed on Jun. 22, 2016, which is hereby incorporated by reference in its entirety.

TECHNICAL FIELD

The present invention relates to a secondary battery and a method for interrupting current of the secondary battery, and more particularly, to an apparatus and method for interrupting current in case of emergency such as short circuit in a secondary battery.

BACKGROUND ART

Secondary batteries are batteries capable of being repeatedly chargeable and dischargeable, and various kinds of secondary batteries are used according to electronic devices that require secondary batteries. Generally, such a secondary battery normally operates with charging or discharging according to a use thereof. However, when the secondary battery is short-circuited due to an external impact or the like, a gas is generated in the secondary battery to increase in pressure and temperature in the secondary battery. In this case, if the gas is not discharged to the outside, or the temperature in the secondary battery steadily increases, fire or explosion may occur. To prevent this phenomenon from occurring, a device for interrupting a flow of current of the secondary battery may be mounted in the secondary battery.

Figure 1:
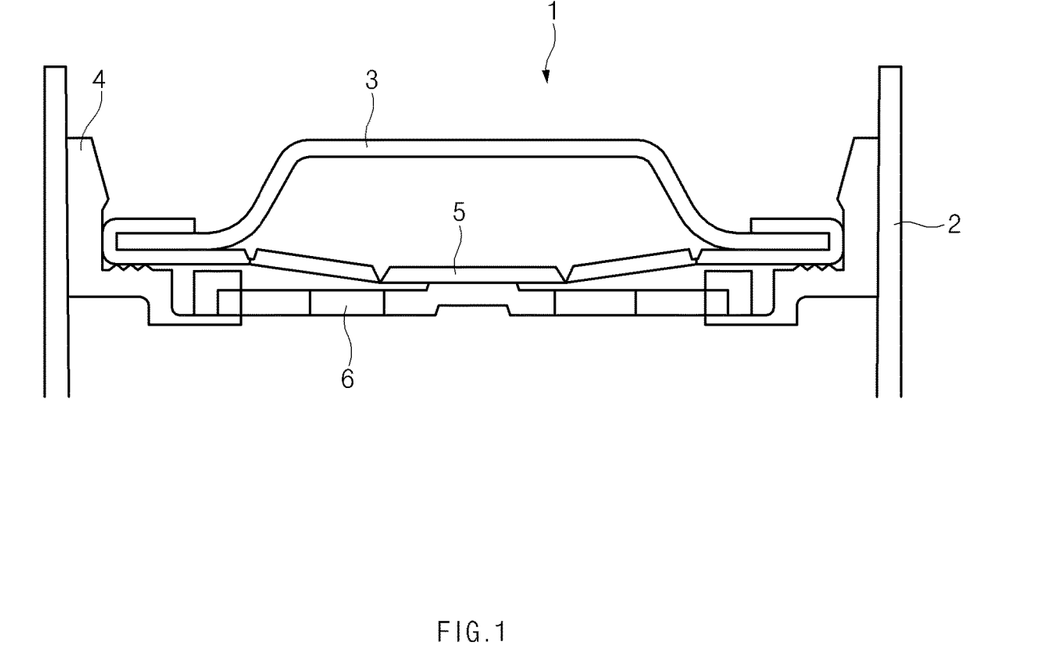
FIG. 1 is a cross-sectional view illustrating an example of a structure of a secondary battery according to a related art.

FIG. 1 is a cross-sectional view illustrating an example of a structure of a secondary battery according to the related art.

As illustrated in FIG. 1, a secondary battery 1 may include a battery can 2 constituting a case of the secondary battery 1 and having an opened upper portion and a cap plate 3 disposed on the upper portion of the battery can 2 to seal the upper portion of the battery can 2. A safety vent may be provided between the battery can 2 and the cap plate 3. Also, a gasket 4 for further sealing the inside of the secondary battery from the outside may be disposed between an inner surface of the battery can 2 and the cap plate 3. Also, a current interrupting device (CID) filter 6 may be attached to a lower portion of the safety vent 5 in a state of being welded to the safety vent 5. The CID filter 6 may be a path through which current flows to allow current passing through the CID filter 6 from an electrode assembly to flow to the safety vent 5.

According to the related art, when the pressure in the secondary battery 1 increases due to the short circuit or the like of the secondary battery 1, the entire safety vent 5 or a central portion of the safety vent 5 may swell up. Thus, a portion or the whole of the safety vent 5 may be broken. When the safety vent 5 is broken, the safety vent 5 may be separated from the CID filter 6 to interrupt current and discharge the gas within the secondary battery 1.

However, the current interrupting principle of the secondary battery according to the related art has a problem that current is not properly interrupted when an internal pressure of the secondary battery does not sufficiently increases due to a reason in which the secondary battery is not properly sealed because the current is interrupted after the internal pressure of the secondary battery increases. Also, there is a problem that fire already occurs before the current is interrupted when overcurrent flows to allow an internal temperature of the secondary battery to abnormally increase due to short circuit or the like before the internal pressure of the secondary batter reaches a predetermined pressure.

DISCLOSURE OF THE INVENTION

Technical Problem

Accordingly, an object of the present invention is to interrupt current when an internal temperature of a secondary battery reaches a predetermined temperature even before an internal pressure of the secondary battery reaches a predetermined pressure to effectively interrupt the current in case of emergency, thereby preventing the secondary battery from being exploded or fired.

Technical Solution

According to an aspect of the present invention so as to achieve the abovementioned object, a secondary battery includes: an electrode assembly; an electrode tab extending from the electrode assembly; a can member accommodating the electrode assembly and having an opened upper portion; a cap assembly coupled to the upper portion of the can member to cover the upper portion of the can member; and a bimetal coming into contact with the electrode tab and the cap assembly at a deformation temperature or less, wherein the bimetal is spaced apart from the cap assembly at the deformation temperature or more.

The cap assembly may include: a cap plate disposed on an outermost portion of the cap assembly; and a safety vent disposed between the cap plate and the electrode assembly and having a surface on which a notch is provided, the electrode tab may include a positive electrode tab; and a negative electrode tab, and the bimetal may be disposed between the safety vent and the electrode assembly to come into contact with the safety vent and the positive electrode tab at the deformation temperature or less and to be spaced apart from the safety vent at the deformation temperature or more.

A material used for manufacturing the negative electrode tab may have electric resistance less than that of nickel (Ni).

The material used for manufacturing the negative electrode tab may include nickel-clad (Ni-Clad).

The bimetal may include: an upper bimetal constituting an upper portion of the bimetal; and a lower bimetal constituting a lower portion of the bimetal, wherein the lower bimetal may have a thermal expansion coefficient less than that of the upper bimetal.

The bimetal may include a shape memory alloy.

The deformation temperature may range from 75° C. to 85° C.

According to another aspect of the present invention so as to achieve the abovementioned object, a method for interrupting current of a secondary battery includes: a short circuit step of allowing an electrode in the secondary battery to be short-circuited; a temperature increasing step in which the bimetal increases in temperature as abnormal current occurring in the short circuit step flows through the bimetal of which at least a portion comes into contact with an electrode tab connected to the electrode of the secondary battery and a cap assembly of the secondary battery; and an interrupting step in which the bimetal is warped through the temperature increasing step and spaced apart from the cap assembly to interrupt current flowing to the cap assembly when the bimetal has a deformation temperature or more.

The secondary battery may include: an electrode assembly; a can member accommodating the electrode assembly; and a cap assembly coupled to an upper portion of the can member, wherein the cap assembly may include: a cap plate disposed on an outermost portion of the cap assembly; and a safety vent disposed between the cap plate and the electrode assembly and having a surface on which a notch is provided, wherein the electrode tab extending from the electrode assembly may include: a positive electrode tab; and a negative electrode tab, in the temperature increasing step, the bimetal may come into contact with the safety vent and the positive electrode tab and increases in temperature by current flowing from the positive electrode tab, and in the interrupting step, the bimetal may be spaced apart from the safety vent to interrupt current flowing to the safety vent.

The negative electrode tab may have electric resistance less than nickel (Ni).

A material for forming the negative electrode tab may include nickel-clad (Ni-Clad).

The bimetal may include: an upper bimetal constituting an upper portion of the bimetal; and a lower bimetal constituting a lower portion of the bimetal, wherein the lower bimetal may have a thermal expansion coefficient less than that of the upper bimetal.

The bimetal may include a shape memory alloy.

The deformation temperature may range from 75° C. to 85° C.

Advantageous Effects

According to the present invention, an object of the present invention is to interrupt the current when the internal temperature of the secondary battery reaches the predetermined temperature even before the internal pressure of the secondary battery reaches the predetermined pressure to effectively interrupt the current in case of emergency, thereby preventing the secondary battery from being exploded or fired.

MODE FOR CARRYING OUT THE INVENTION

Hereinafter, a structure of a secondary battery according to an embodiment of the present invention will be described with reference to the accompanying drawings.

Secondary Battery

Figure 2:
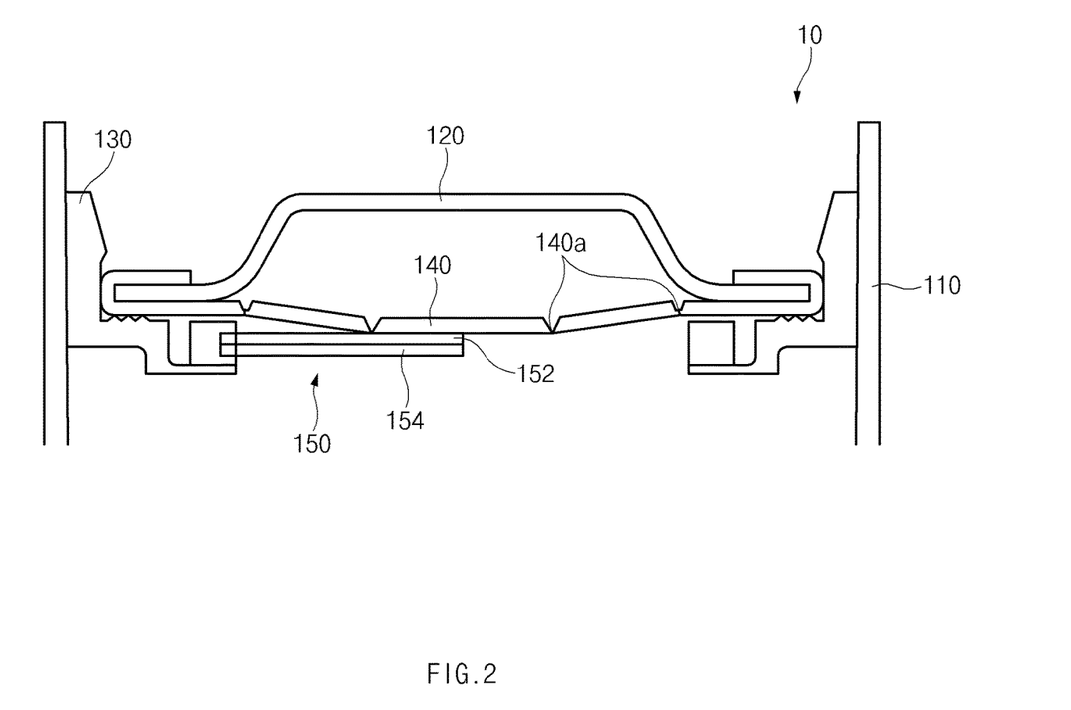
FIG. 2 is a cross-sectional view illustrating a structure of a secondary battery in ordinary times according to an embodiment of the present invention.
Figure 3:
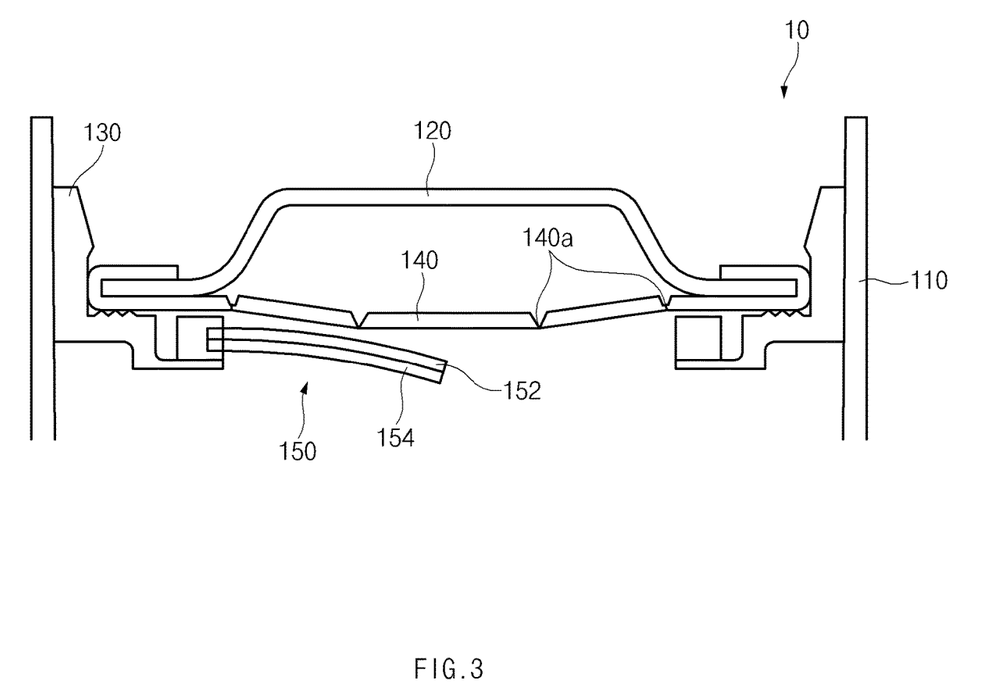
FIG. 3 is a cross-sectional view illustrating a structure of a secondary battery in case of emergency according to an embodiment of the present invention.

FIG. 2 is a cross-sectional view illustrating a structure of a secondary battery in ordinary times according to an embodiment of the present invention, and FIG. 3 is a cross-sectional view illustrating a structure of a secondary battery in case of emergency according to an embodiment of the present invention.

FIG. 2 illustrates a secondary battery 10 according to an embodiment of the present invention. The secondary battery 10 may have various shapes. For example, the secondary battery 10 may be a cylindrical secondary battery having a cylindrical shape.

The secondary battery 10 may include a can member 110 for accommodating internal components like an electrode assembly of the secondary battery 10. The can member 110 may have a structure in which an upper portion is opened. When the secondary battery 10 has the cylindrical shape, the can member 110 may also have a cylindrical shape.

A cap plate 120 may be disposed on the upper portion of the can member 110. The cap plate 120 may be a component for covering the upper portion of the can member 110. That is, the cap plate 120 may be a component that seals the upper portion of the can member 110 to isolate an inner space of the can member 110 from the outside and also be a component that forms an electrode terminal (a positive electrode terminal of the present invention) of the secondary battery.

To improve sealability of the inside of the can member 110 (or the inside of the secondary battery 10), a gasket 130 may be disposed between an inner surface of the can member 110 and the cap plate 120.

Also, a safety vent 140 may be disposed on a lower portion of the cap plate 120. The safety vent 140 may be disposed between the cap plate 120 and the electrode assembly (see FIG. 4). One or more notches 140a may be provided on the safety vent 140. When the notches 140a are provided on the safety vent 140, if an internal pressure of the secondary battery increases, the safety vent may be broken through the notches to separate a portion of the safety vent from the other portion of the safety vent, thereby interrupting a flow of current. The cap plate 120, the gasket 130, and the safety vent 140, which are described above, may be assembled with each other and then coupled to the upper portion of the can member 110 to constitute a cap assembly that covers the upper portion of the can member 110.

The secondary battery according to an embodiment of the present invention may include a bimetal 150.

The bimetal is a component manufactured by attaching different kinds of metals. The bimetal means that it is manufactured by generally attaching two different kinds of metals to each other in the meaning of 'bi' which is a prefix. However, the bimetal used in the present specification may be interpreted to include a component that is manufactured by attaching not only two kinds of metals but also three or more kinds of metals to each other.

As illustrated in FIG. 2, the bimetal 150 may come into contact with the safety vent 140 in ordinary times at which the secondary battery normally operates. Also, although not shown, the bimetal 150 may come into contact with a positive electrode tab of the electrode assembly. Here, the meaning of 'contact' may be interpreted not only as coming into direct contact, but also as coming into indirect contact through other components.

As described above, the bimetal 150 according to an embodiment of the present invention may come into contact with the safety vent 140 in ordinary times and be spaced apart from the safety vent 140 when an electrode of the secondary battery is short-circuited.

In more detail, as illustrated in FIG. 3, in case of emergency such as the short circuit of the secondary battery, the bimetal 150 may be warped downward and thus spaced apart from the safety vent 140. Thus, the flow of the current through the safety vent 140 may be interrupted to secure safety of the secondary battery.

Here, the warping of the bimetal 150 may be caused by an increase in temperature of the bimetal. That is, according to an embodiment of the present invention, since the bimetal 150 in which metals having different thermal expansion coefficients are attached to each other is applied to the secondary battery, the bimetal 150 may be changed in shape according to a temperature. Thus, when the bimetal 150 reaches a predetermined temperature or more, the bimetal 150 may be spaced apart from the safety vent 140. Hereinafter, in the present specification and claims, a temperature at which the bimetal 150 begins to be spaced apart from the safety vent 140 or the cap assembly will be referred to as a 'deformation temperature'.

According to the present invention, the deformation temperature of the bimetal 150 may be about 80° C. That is, according to an embodiment of the present invention, the bimetal 150 comes into contact with the safety vent 140 in ordinary times. Then, when the bimetal 150 has a temperature greater than about 80° C., the bimetal 150 may be spaced apart from the safety vent 140 to interrupt a flow of current through the safety vent 140. For example, according to an embodiment of the present invention, the bimetal 150 may have a deformation temperature ranging from 75° C. to 85° C.

The bimetal 150 is manufactured by attaching two or more kinds of metals to each other. Thus, the bimetal 150 may include an upper bimetal 152 constituting an upper portion of the bimetal 150 and a lower bimetal 154 constituting a lower portion of the bimetal 150. The upper bimetal 152 may come into contact with the safety vent 140 in ordinary times.

Since the bimetal according to an embodiment of the present invention has to be spaced apart from the safety vent at the deformation temperature or more, it is necessary to be warped at the deformation temperature or more. For this, the lower bimetal 154 may have a thermal expansion coefficient less than that of the upper bimetal 152. Also, the bimetal 150 may include a shape memory alloy.

When the shape memory alloy is applied to the bimetal 150, since the bimetal 150 has a uniform shape according to a temperature thereof, the bimetal 150 coming into contact with the safety vent 140 and spaced apart from the safety vent 140 at the deformation temperature may be secured to improve the safety of the secondary battery when the short circuit occurs.

Figure 4:
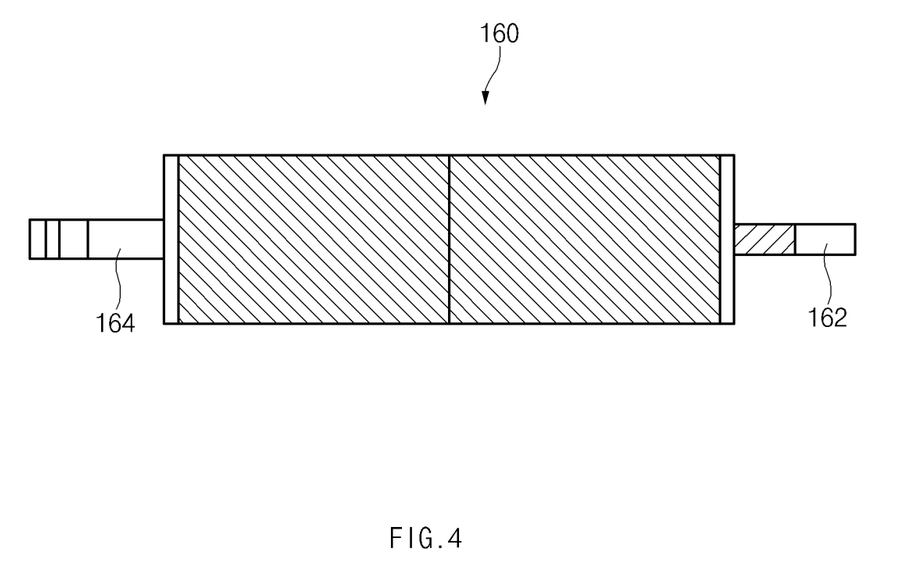
FIG. 4 is a plan view illustrating a structure of an electrode assembly that is capable of being applied to the secondary battery according to an embodiment of the present invention.

FIG. 4 is a plan view illustrating a structure of an electrode assembly that is capable of being applied to the secondary battery according to an embodiment of the present invention.

An electrode assembly 160 may be manufactured by alternately stacking an electrode and a separator. For example, the electrode assembly 160 may be manufactured through various manufacturing methods and have various shapes.

As illustrated in FIG. 4, a positive electrode tab 162 and a negative electrode tab 164, which extend from the electrode assembly 160, may be disposed on ends of the electrode assembly 160. Here, the positive electrode tab 162 may come into contact with the bimetal as described above.

The negative electrode tab 164 may be manufactured by using various materials. According to an embodiment of the present invention, a material used for manufacturing the negative electrode tab 164 may have electric resistance less than that of nickel (Ni). Also, the material used for manufacturing the negative electrode tab 164 may be nickel-clad (Ni-Clad).

According to an embodiment of the present invention, in case of emergency such as the short circuit of the electrode, the positive electrode tab coming into contact with the bimetal increases in temperature, and thus, the bimetal may also increase in temperature. Here, it is necessary to quickly rise the temperature of the positive electrode tab so that the bimetal is more quickly spaced apart from the safety vent in case of the emergency. Here, although the short circuit of the same electrode occurs, if the negative electrode tab has relatively large resistance, the current decreases in intensity. As a result, the positive electrode tab may relatively slowly increase in temperature, and thus, the bimetal may also relatively slowly increase in temperature. Therefore, when the negative electrode tab has relatively large resistance, since the bimetal relatively slowly increases in temperature, the current may not be quickly interrupted when the short circuit occurs.

Thus, according to an embodiment of the present invention, the material used for manufacturing the negative electrode tab 164 may have electric resistance less than nickel (Ni) that is generally used for manufacturing the negative electrode tab according to the related art.

Particularly, the material used for manufacturing the negative electrode tab 164 may be, for example, Ni-Clad formed by attaching nickel to a surface of a metal such as copper. Since the Ni-Clad has electric resistance less than that of nickel, if the Ni-Clad is used as the material for forming the negative electrode tab, the current may further increase in intensity when the electrode is short-circuited, and thus, the positive electrode tab may very quickly increase in temperature. As a result, since the bimetal coming into contact with the positive electrode tab quickly and sharply increases in temperature, the current may be effectively interrupted before an accident occurs in case of the short circuit of the electrode. The positive electrode tab 162 may be manufactured by using aluminum.

Hereinafter, a method for interrupting current of the secondary battery according to an embodiment of the present invention will be described.

Method for Interrupting Current of Secondary Battery

Figure 5:
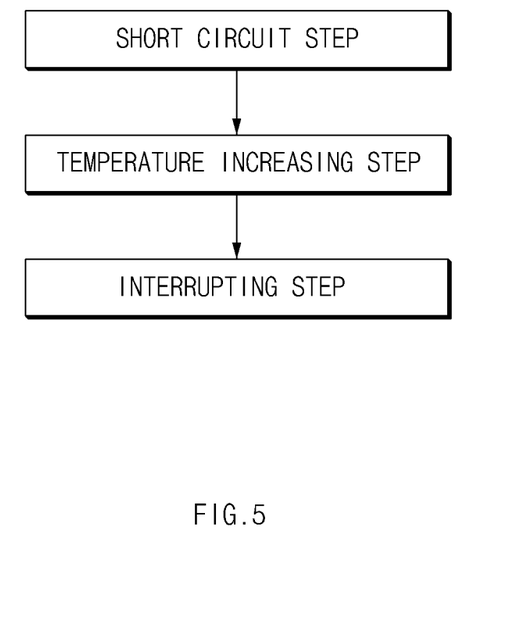
FIG. 5 is a flowchart for explaining a method for interrupting current of the secondary battery according to an embodiment of the present invention.

FIG. 5 is a flowchart for explaining a method for interrupting current of the secondary battery according to an embodiment of the present invention.

As illustrated in FIG. 5, a method for interrupting current of the secondary battery according to an embodiment of the present invention may include a short circuit step of allowing an electrode in the secondary battery to be short-circuited. When the short circuit step is performed, abnormal current occurring in the short circuit step may flow through a bimetal of which at least a portion comes into contact with an electrode tab (more particularly, a positive electrode tab) connected to the electrode of the secondary battery and a safety vent of the secondary battery. Thus, a temperature increasing step in which the bimetal increases in temperature may be performed. When the temperature increasing step is performed, the bimetal may be warped through the temperature increasing step. Thus, an interrupting step in which the bimetal is spaced apart from the safety vent to interrupt current flowing to the safety vent may be performed. A temperature of the bimetal when the bimetal is spaced apart from the safety vent is defined as a 'deformation temperature' in this specification as described above.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
an electrode assembly;
an electrode tab electrically connected to and extending from the electrode assembly, the electrode tab including a positive electrode tab and a negative electrode tab, the negative electrode tab having an electrical resistance less than that of nickel (Ni);
a can member accommodating the electrode assembly and having an opened upper portion;
a cap assembly coupled to the upper portion of the can member to cover the upper portion of the can member, the cap assembly including a cap plate disposed on an outermost portion of the cap assembly and a safety vent disposed between the cap plate and the electrode assembly, the safety vent configured to rupture due to increased internal pressure within the battery; and
a heat-deflectable component disposed between the safety vent and the electrode assembly, the heat-deflectable component including at least two different kinds of metals attached to each other, and the heat-deflectable component being electrically connected to the positive electrode tab,
wherein, when a temperature of the heat-deflectable component is less than a predetermined deformation temperature, the heat-deflectable component is configured to electrically contact the safety vent so that the heat-deflectable component forms an electrical connection between the electrode tab and the safety vent, and
wherein, when the temperature of the heat-deflectable component is at or higher than the predetermined deformation temperature, the heat-deflectable component is configured to deform so as to be spaced apart from the safety vent to thereby sever the electrical connection between the electrode tab and the safety vent.

2. The secondary battery of claim 1, wherein the material of the negative electrode tab comprises nickel-clad (Ni-Clad).

3. The secondary battery of claim 1, wherein the heat-deflectable component comprises a bimetal component including:
an upper bimetal layer constituting an upper portion of the bimetal component; and
a lower bimetal layer constituting a lower portion of the bimetal component,
wherein the lower bimetal layer has a thermal expansion coefficient less than that of the upper bimetal layer.

4. The secondary battery of claim 1, wherein the heat-deflectable component comprises a shape memory alloy.

5. The secondary battery of claim 1, wherein the predetermined deformation temperature ranges from 75° C. to 85° C.

6. A method for interrupting current of a secondary battery, the method comprising:

a short circuit step of allowing an electrode in the secondary battery to be short-circuited, the secondary battery comprising:
an electrode assembly including the electrode;
an electrode tab electrically connected to and extending from the electrode assembly, the electrode tab including a positive electrode tab and a negative electrode tab, the negative electrode tab having an electrical resistance less than that of nickel (Ni);
a can member accommodating the electrode assembly;
a cap assembly coupled to an upper portion of the can member, the cap assembly including a cap plate disposed on an outermost portion of the cap assembly and a safety vent disposed between the cap plate and the electrode assembly, the safety vent configured to rupture due to increased internal pressure within the battery; and
a heat-deflectable component disposed between the safety vent and the electrode assembly, the heat-deflectable component including at least two different kinds of metals attached to each other, and the heat-deflectable component being electrically connected to the positive electrode tab;
a temperature increasing step in which the heat-deflectable component increases in temperature as a result of an abnormal amount of current flowing through the heat-deflectable component from the electrode tab to the safety vent due to the short circuit step; and
an interrupting step in which the heat-deflectable component is warped as a result of the heat-deflectable component reaching a predetermined deformation temperature due to the temperature increasing step so as to become spaced apart from the safety vent to thereby sever an electrical connection between the electrode tab and the safety vent and interrupt the current flowing through the heat-deflectable component from the electrode tab to the safety vent.

7. The method of claim 6, wherein the material of the negative electrode tab comprises nickel-clad (Ni-Clad).

8. The method of claim 6, wherein the heat-deflectable component comprises a bimetal component including:
an upper bimetal layer constituting an upper portion of the bimetal component; and
a lower bimetal layer constituting a lower portion of the bimetal component,
wherein the lower bimetal layer has a thermal expansion coefficient less than that of the upper bimetal layer.

9. The method of claim 6, wherein the heat-deflectable component comprises a shape memory alloy.

10. The method of claim 6, wherein the predetermined deformation temperature ranges from 75° C. to 85° C.

11. The secondary battery of claim 1, wherein the heat-deflectable component is electrically connected to the positive electrode tab, such that the heat-deflectable component forms the electrical connection between the positive electrode tab and the safety vent when the temperature of the heat-deflectable component is less than the predetermined deformation temperature, and such that the electrical connection between the positive electrode tab and the safety vent is severed when the temperature of the heat-deflectable component is at or higher than the predetermined deformation temperature.

12. The method of claim 6, wherein the heat-deflectable component is electrically connected to the positive electrode tab, such that the heat-deflectable component forms the electrical connection between the positive electrode tab and the safety vent when the temperature of the heat-deflectable component is less than the predetermined deformation temperature, and such that the electrical connection between the positive electrode tab and the safety vent is severed when the temperature of the heat-deflectable component is at or higher than the predetermined deformation temperature.

* * * * *